United States Patent [19]

Takesako et al.

[11] Patent Number: 5,017,026

[45] Date of Patent: May 21, 1991

[54] APPARATUS FOR AUTOMATICALLY EXCHANGING A PASSBOOK

[75] Inventors: Sumiyoshi Takesako, Yamato; Akira Morito, Tokyo, both of Japan

[73] Assignee: Kabushiki Kaisha Toshiba, Kawasaki, Japan

[21] Appl. No.: 524,926

[22] Filed: May 18, 1990

[30] Foreign Application Priority Data

May 19, 1989 [JP] Japan ................................ 1-125904

[51] Int. Cl.$^5$ ......................... B41J 3/28; G06F 15/30

[52] U.S. Cl. ...................................... 400/24; 235/379; 364/408; 902/18; 902/19

[58] Field of Search ........................... 400/62, 24, 105; 235/379; 902/17-19; 364/408

[56] References Cited

U.S. PATENT DOCUMENTS

| | | | |
|---|---|---|---|
| 4,143,977 | 3/1979 | Kurihara et al. | 400/24 |
| 4,279,413 | 7/1981 | Siwik et al. | 400/24 |
| 4,423,313 | 12/1983 | Tanigaki | 902/19 |
| 4,542,287 | 9/1985 | Watanabe | 235/379 |
| 4,567,358 | 1/1986 | Takmatsu et al. | 235/379 |
| 4,571,489 | 2/1986 | Watanabe | 902/7 |
| 4,600,828 | 7/1986 | Nogami et al. | 235/379 |
| 4,602,149 | 7/1986 | Tateisi et al. | 235/379 |
| 4,608,485 | 8/1986 | Miura | 235/379 |
| 4,641,239 | 2/1987 | Takesako | 902/4 |
| 4,737,911 | 4/1988 | Freeman, Jr. | 235/379 |
| 4,776,711 | 10/1988 | Harada | 400/24 |
| 4,864,108 | 9/1989 | Hamada et al. | 235/379 |

*Primary Examiner*—Eugene H. Eickholt
*Attorney, Agent, or Firm*—Cushman, Darby & Cushman

[57] ABSTRACT

An apparatus for derailing with a passbook having a plurality of data recording surfaces, includes a passbook recording unit in which data is recorded on the recording surfaces of the passbook introduced in a conveying passage of the apparatus via an access opening. A plurality of new passbook storing boxes are arranged along the conveying passage, and a passbook detector for detecting the presence or absence of new passbook is provided in each passbook storing box. When all spaces in the data recording surfaces of the passbook received in the conveying passage are used up, a new passbook is supplied from one of the storing boxes to the conveying passage, so that the remains of data is recorded on the data recording surfaces of the new passbook by the recording unit. When all data recording surfaces of one passbook introduced into the conveying passage are used up while the passbook detector is detecting the absence of new passbooks in one storing box, a passbook supply switching unit controls the storing boxes such that one new passbook is supplied from another storing box to the conveying passage.

19 Claims, 7 Drawing Sheets

APPARATUS FOR AUTOMATICALLY EXCHANGING A PASSBOOK

BACKGROUND OF THE INVENTION

1. Field of the Invention

The present invention relates to an apparatus for dealing with a passbook, wherein various operations including a data recording into a data recording surface of the passbook can be performed.

2. Description of the Related Art

An apparatus for dealing with a passbook is incorporated into, for example, an ATM (Automated Teller Machine) which is used at a bank, a stock company and the like. In this machine, after a bankbook (one kind of the passbook) is inserted into the ATM in a state that the bankbook is opened, the content of the transaction, which was done between a bank and a customer by the ATM, is recorded on a predetermined space in a plurality of recording surfaces of the bankbook corresponding to the content of the transaction, and the recorded bankbook is discharged from the ATM. Moreover, in the ATM, in a case where the above transaction is conducted in a state that a bank card in place of the bankbook is inserted, the content of the transaction is recorded on one of a number of paper sheets housed in the ATM, and the recorded sheet is discharged from the ATM.

In a conventional ATM, if the predetermined space is used up while the content of the transaction is being recorded on the predetermined space in a plurality of recording surfaces of the bankbook inserted into the ATM, the recording of the content of the transaction is stopped at this time, and the bankbook is discharged from the ATM. The remains of the content of the transaction whose recording is stopped are memorized in a host computer connected to the ATM. There is conventionally the ATM in which the remains of the content of the transaction is memorized in the host computer and the sheet on which the remains are recorded is discharged.

In a case where the predetermined space in a plurality of recording surfaces of the bankbook corresponding to the content of the transaction is used up, the customer must ask bank clerks to issue a new bankbook at a service counter of the bank. Due to this, if such a case occurs out of the business hours at the service counter, the customer must go to the bank again during the business hours of the service counter to have a new bankbook issued. Also, the bank clerks at the service counter has to spend a part of their working hours on a simple work, i.e., issuing new bankbook.

SUMMARY OF THE INVENTION

The present invention is contrived under consideration of the above-mentioned problems, and an object of the present invention is to provide an apparatus for dealing with a passbook wherein: if the predetermined space is used up while data is being recorded on the predetermined space in a plurality of recording surfaces of the inserted passbook, a new bankbook can be immediately issued at that place; even if the amount of storage of new passbooks are increased in accordance with the increment of the operating time of the apparatus for dealing with the passbook out of the business hours at the service counter, not only the replenishment of new passbooks is easily performed but also time required for the above replenishment can be shortened, thereby shortening time when the customer keeps waiting during the above replenishment, and as a result, on the installation side of the apparatus, it is possible to alleviate a cumbersome maintenance and reduce useless time for the customer, thereby improving service to the customer.

To attain the above object, an apparatus for dealing with a passbook according to the present invention comprises: an access opening for inserting or drawing a passbook having a plurality of data recording surfaces; passbook conveying means for receiving the passbook inserted into the access opening and returning the received passbook to the access opening; means for recording data on a space in the plurality of data recording surfaces of the passbook received in the passbook conveying means via the access opening; a plurality of passbook storing means, arranged along the passbook conveying means, for storing a plurality of new passbook which are the same kind as the above described passbook; passbook detecting means for detecting the presence or absence of the passbook in each of the plurality of passbook storing means; passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the recording means; and means for controlling the new passbook supplying means such that one new passbook is supplied from another passbook storing means to the conveying means when the passbook detecting means is detecting the absence of the passbook in one of the passbook storing means.

Particularly, in the present apparatus, a number of passbooks are dispersed in the plurality of passbook storing means, thereby the replenishment of new passbooks are made easier and time required for the replenishment can be shortened. In other words, it is unnecessary to stop the passbook dealing apparatus for the replenishment of the passbooks until the passbooks are used up in all plurality of passbook storing means. Even if one of the plurality of passbook storing means if emptied, a new passbook is supplied to the passbook conveying means for other passbook storing means. Therefore, it is possible to replenish new passbooks in the empty passbook storing means during this time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

The apparatus for dealing with a bankbook according to one embodiment of the present invention will be explained with reference to the accompanying drawings.

DETAILED DESCRIPTION OF THE PREFERRED EMBODIMENTS

Figure 1:
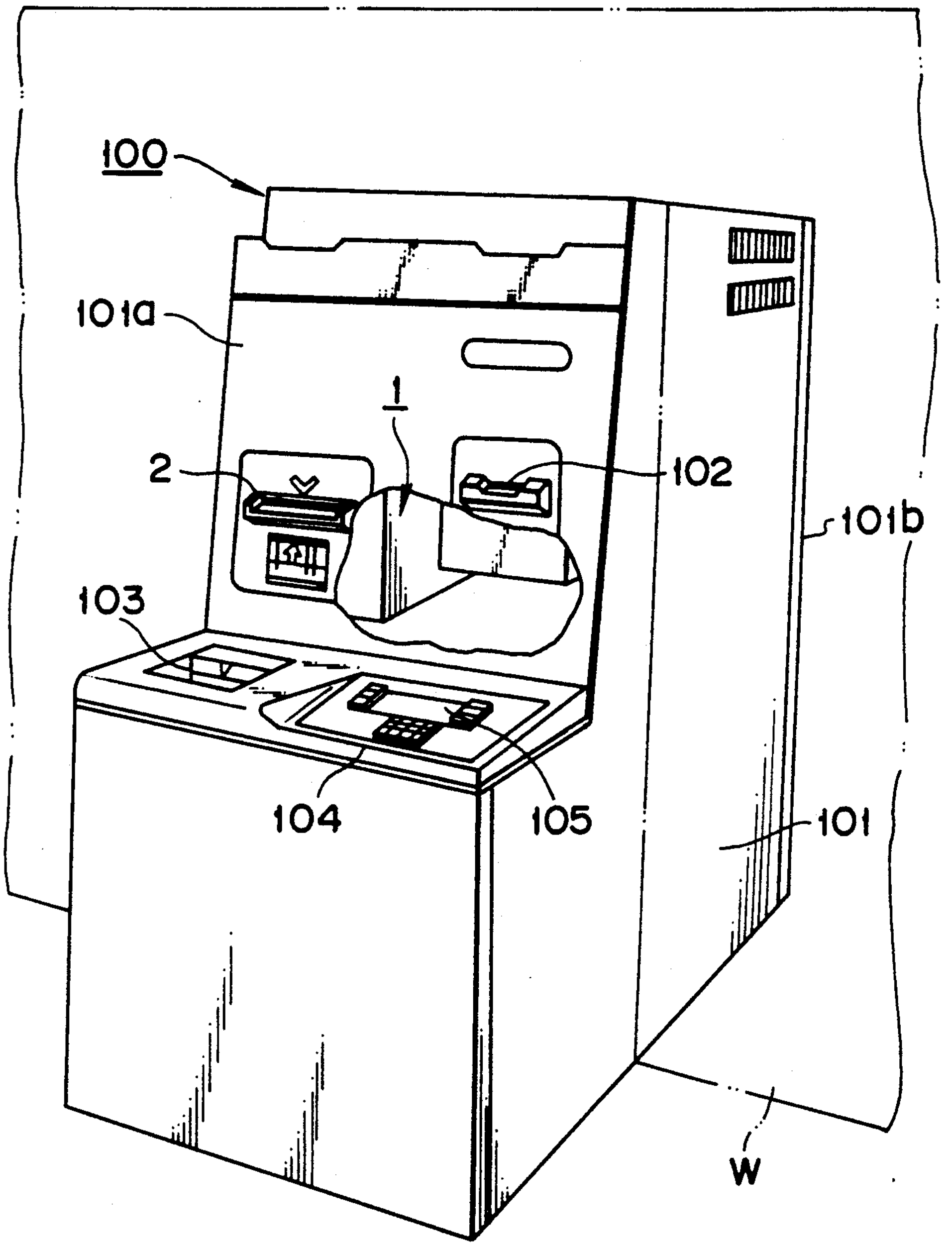
FIG. 1 is a schematic perspective view showing a front of the ATM into which an apparatus, according to an embodiment of the present invention, for dealing with a bankbook is incorporated.
Figure 2:
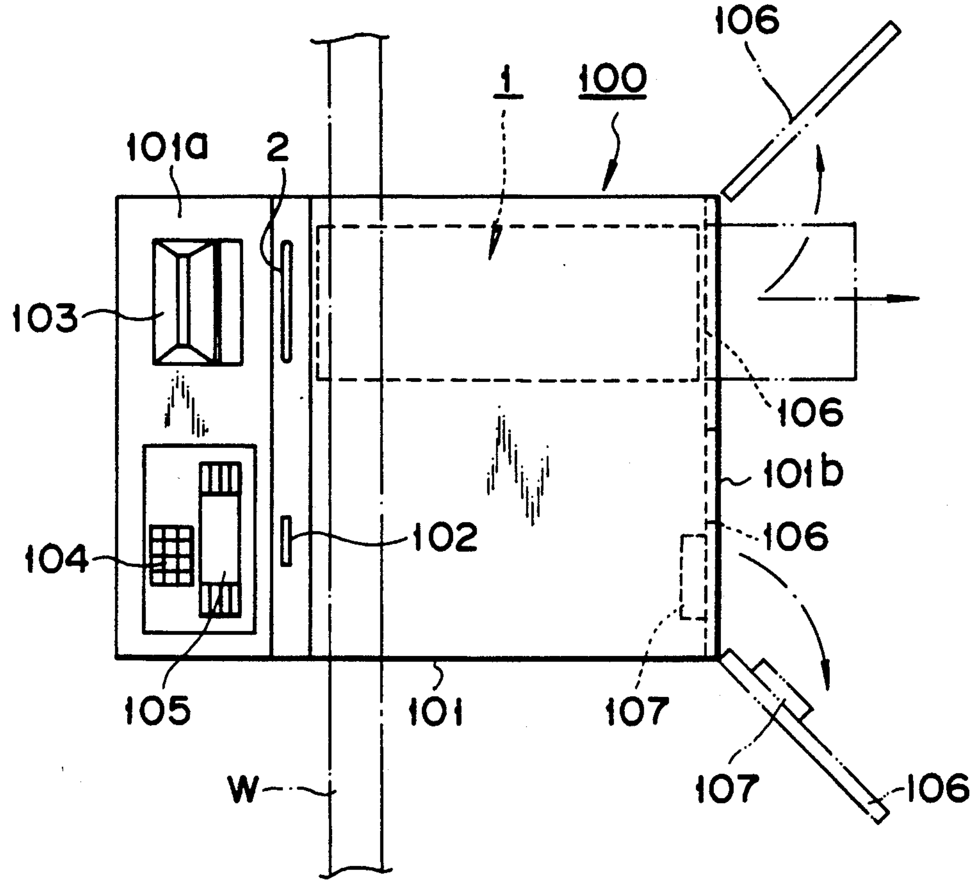
FIG. 2 is a schematic plane view showing a state when the replenishment of new bankbooks into bankbook storing means of the bankbook dealing apparatus in the ATM of FIG. 1 is performed.

As shown in FIGS. 1 and 2, an ATM 100 is installed on, for example, a partition wall "W" between a customers floor and a bank clerks floor, and a customer operation panel 101*a* on a sheath housing 101 is arranged in the customers floor side and a bank clerk operation panel 101*b* on the sheath housing 101 is arranged in the bank clerks floor side.

In the sheath housing 101, there is stored a printer unit 1 for a bankbook and data recording paper sheet as an apparatus for dealing with a bank-book, according to one embodiment of the present invention.

On the customer operation panel 101*a*, there are arranged a bankbook/sheet access opening 2 for inserting and discharging the bankbook in an opened state into and from the printer unit 1 and for discharging a paper sheet from the printer unit 1, a bank card insertion slot 102, a banknote depositing and withdrawing port 103, a customer operation keyboard 104, and a data display screen 105.

The bank clerk operation panel 101*b* is formed of a pair of doors 106 of French doors type. The paired doors 106 are opened as shown in a two-dot chain line of FIG. 2 when the printer unit 1 in the sheath housing 101 and other various units are checked, maintained, or repaired, and new bankbooks, new paper sheets, and new ink ribbon are replenished in the printer unit 1. The printer unit 1 can be drawn out from the sheath housing 101 as shown in the two-dot chain line of FIG. 2 when the paired doors 106 are opened.

Figure 3:
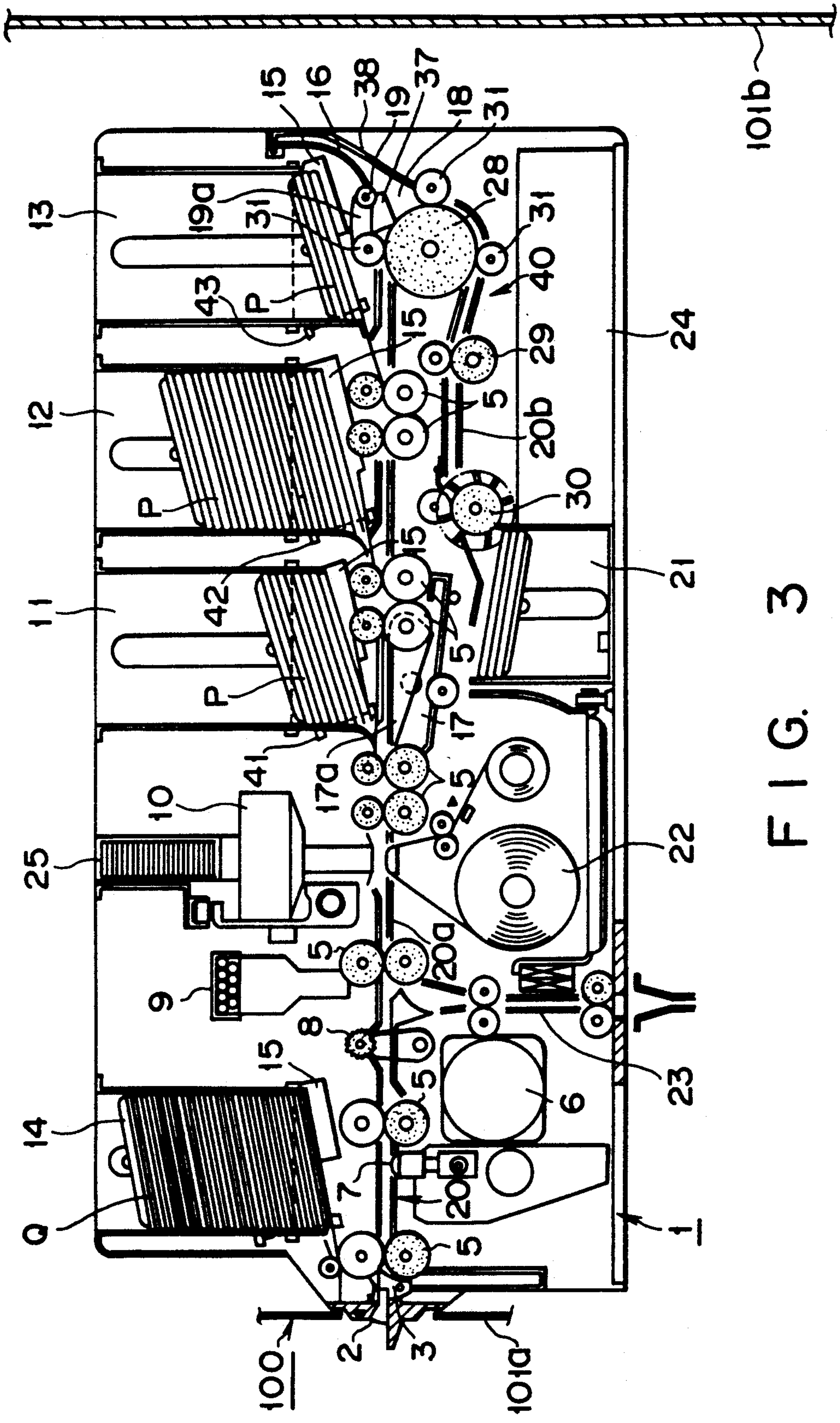
FIG. 3 is a longitudinal sectional view schematically showing the entire structure of the bankbook dealing apparatus in the ATM of FIG. 1.

As shown in FIG. 3, the printer unit 1 comprises a shutter 3 at the bankbook/sheet access opening 2. The shutter 3 is opened by an electromagnetic solenoid type driving means (not shown) when an optical type detector (not shown) provided in the bankbook/sheet access opening 2 detects the bankbook inserted into the bankbook/sheet access opening 2 in the opening state.

A first bankbook conveying passage 20*a* as bankbook conveying means 20 substantially horizontally extends from the bankbook/sheet access opening 2 toward the bank clerk operation panel 101*b* of the sheath housing 101. The bankbook conveying means 20 has a plurality of pairs of bankbook conveying rollers 5 arranged along the first bankbook conveying passage 20*a* to be spaced from each other. The bankbook conveying roller pairs 5 are sequentially driven by a stepping motor 6 when the bankbook in the opening state is inserted into the bankbook/sheet access opening 2, and moves the bankbook toward the rear end of the first bankbook conveying passage 20*a*.

A magnetic head 7, auto turn page means 8, an optical type line find 9, printing means 10 using an ink ribbon 25, and first to third bankbook storing means 11, 12, 13 are arranged above and along the first bankbook conveying passage 20*a*. When the bankbook in the opening state is inserted into the bankbook/sheet access opening 2, the auto turn page 8 is driven by an exclusive motor (not shown) in order to move the bankbook toward the rear end of the first bankbook conveying passage 20*a* in cooperation with the plurality of bankbook conveying roller pairs 5.

A journal 22 is arranged under the first bankbook conveying passage so as to opposite the printing means 10, and means 40 for collecting and storing the left-ignored bankbook/sheet (described later) is also arranged under the first bankbook conveying passage 20*a* at a position opposing the first to third bankbook storing means 11, 12, 13. Moreover, a power source 24 for the printer unit 1 is arranged under the first bankbook conveying passage 20*a* at a position closest to the bank clerk operation panel 101*b* of the sheath housing 101 of the ATM.

Furthermore, in the printer unit 1, paper sheet storing means 14 is provided in the vicinity of the bankbook/-sheet access opening 2 and above the first bankbook conveying passage 20*a*.

The magnetic head 7 scans a magnetic strip provided on the back cover of the opened bankbook inserted into the bankbook/sheet access opening 2 in order to read out terminal data such as an account number, name of bankbook holder and the like recorded in the magnetic strip. In a case where terminal data cannot be read out from the magnetic strip or the read terminal data is not consistent with host data recorded in the host computer connected to the ATM, the bankbook is sent back to the bankbook/sheet access opening 2 and is maintained in a state that the bankbook is projected out from the bankbook/sheet access opening 2. In a case of the appropriate bankbook in which terminal data read out from the magnetic strip of the bankbook is consistent with host data recorded in the host computer connected to the ATM, a page mark on the opened page and a line printed on the opened data recording surface are read by the optical line find 9. Moreover, data, which is recorded in the host computer but not recorded in the bankbook, is printed on the space in the data recording surface of the opened page by the printing means 10. Also, that data is recorded in the journal 22. Moreover, the printing means 10 prints the content of the transaction, which has been conducted between the customer operation keyboard 104 and the host computer while the bankbook is inserted in the above mentioned manner, on the space in the data recording surface of the opened page of the bankbook and the journal 22.

When the data recording surface of the opened page of the bankbook is used up while the printing is performed by the printing means 10, the printing means 10 is once stopped, thereafter the bankbook is moved from the position corresponding to the printing means 10 to the auto turn page means 8 along the first bankbook conveying passage 20*a*, thereby a page is turned by the auto turn page means 8. Next, the bankbook is moved back to the printing means 10 again. However, in the middle of the movement, the optical type line find 9 checks whether or not the page turning operation is correctly performed. The bankbook, in which the page turning operation is correctly performed, is returned to the position corresponding to the printing means 10, and then the printing means 10 prints the remains of data on a new data recording surface of the turned page of the bankbook and the journal 22. Also, the bankbook, in which the page turning operation is not correctly performed, is returned to the auto turn page means 8 so as to be performed again the page turning operation.

In each of the lower ends of the first to third bankbook storing means 11, 12, 13 and sheet storing means 14, there is provided a picker 15 for supplying a new bankbook or a paper sheet to the first bankbook conveying passage 20*a* one by one from each of the first to third bankbook storing means 11, 12, 13 and sheet storing means 14.

Figure 4:
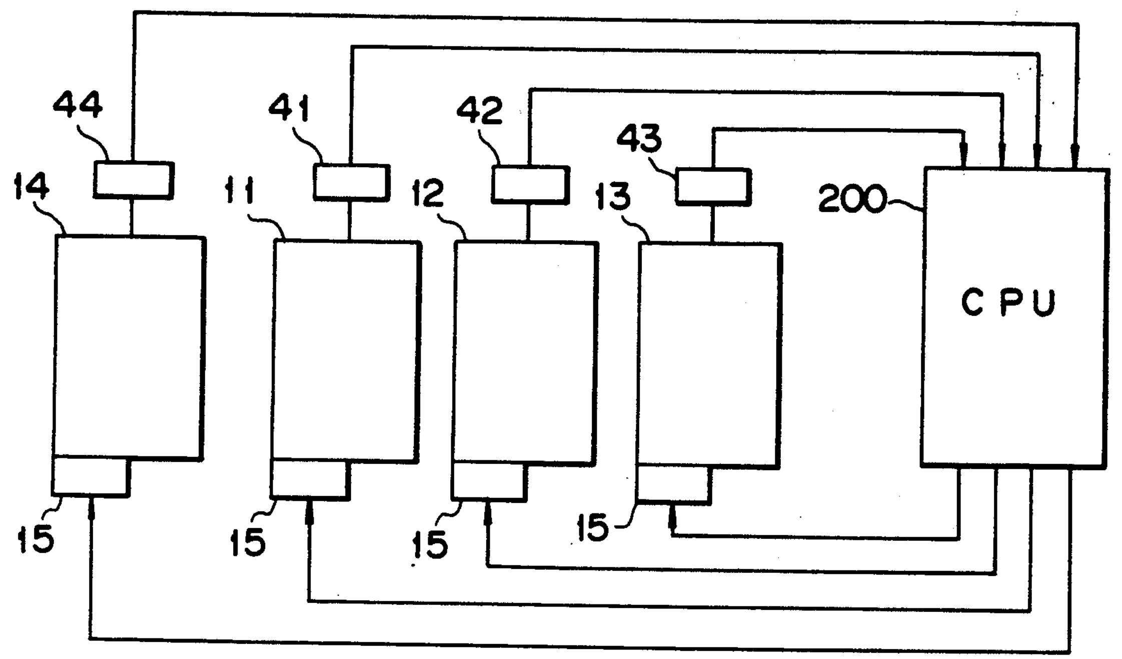
FIG. 4 is a schematic block diagram of a control circuit of bankbook supply switching means in the bank-book dealing apparatus in the ATM of FIG. 1.

Also, in each of the first to third bankbook storing means 11, 12, 13 and sheet storing means 14, there are provided bankbook detecting means 41, 42, 43 and sheet detecting means 44, as shown in FIG. 4, for detecting the presence or absence of the bankbook or sheet in these storing means. The pickers 15, the bankbook detecting means 41, 42, 43 and sheet detecting means 44 of the first to third bankbook storing means 11, 12, 13 and sheet storing means 14 are connected to a CPU 200 serving as controlling means.

When all predetermined data recording surfaces of the bankbook is used up while the printing means 10 is printing, the bankbook is once conveyed into a bankbook sidetracking passage 16 provided in the rear end of the first bankbook conveying passage 20*a* to be curved upwardly.

Next, a new bankbook P is supplied from the third bankbook storing means 13, which is located at a position closest to the bank clerk operation panel 101*b* of the sheath housing 101 of the ATM, to the first conveying passage 20*a* by the picker 15.

In each of the first to third bankbook storing means 11, 12, 13, a plurality of new bankbooks P are piled up in a state that the pages are closed. While the new bankbook P supplied to the first bankbook conveying passage 20*a* from the third bankbook storing means 13 is moved to the bankbook/sheet access opening 2, data such as an account number, a name of bankbook holder and the like, which was read from the magnetic strip of the rear cover of the above described used up bankbook by the magnetic head 7 when the used up bankbook is inserted into the bankbook/sheet access opening 2, is first printed on the front cover of the new bankbook P by the printing means 10.

Next, the front cover is turned by the auto turn page means 8 and a first page of the predetermined data recording surfaces is opened. Then, data such as an account number, a name of customer and the like, which was read by the magnetic head 7 from the magnetic strip of the front cover of the above described used up bankbook, is recorded in the magnetic stripe on the opened rear cover of the new bankbook P by the magnetic head 7. Moreover, the new bankbook is returned to the position corresponding to the printing means 10 again, and the remains of data to be printed is printed on the first page of the predetermined data recording surfaces of the new bankbook by the printing means 10. The new bankbook P after the printing is finished is sent to the bankbook/sheet access opening 2 in the page opening state, and is held at the bankbook/sheet access opening 2 with projecting it from the opening 2 into the outer space.

If the new bankbook P after the printing is finished is drawn out from the bankbook/sheet access opening 2 by the customer, the used up previous bankbook, which was sidetracked in the bankbook sidetracking passage of the inner end of the first bankbook conveying passage 20*a*, is sent to the bankbook/sheet access opening 2 with opening the page thereof, and is held at the bankbook/-sheet access opening 2 in a state that the bankbook is projected from the opening 2 into the outer spac for the drawing out thereof by the customer.

In a case where the transaction is conducted by the use of a bank card in place of the bankbook, one paper sheet is supplied to a place close to the bankbook/sheet access opening 2 of the first bankbook conveying passage 20*a* from the sheet storing means 14 by the picker 15 after finishing the transaction. The sheet is conveyed to the printing means 10 through the first bankbook conveying passage 20*a*, and the content of the transaction is printed on the sheet by the printing means 10. The printed sheet is not sent to the bankbook/sheet access opening 2, but led to a conveying passage 23 for the printed sheet, which is branched downward from the first bankbook conveying passage 20*a* at the portion between auto turn page means 8 and the line find 9. Thereafter, the printed sheet is supplied to the banknote depositing and withdrawing port 103 of the customer operation panel 101*a* of the sheath housing 101 of the ATM 100, and the customer withdraws the printed paper together with the disbursed banknote from the banknote depositing and withdrawing port 103.

Figure 5:
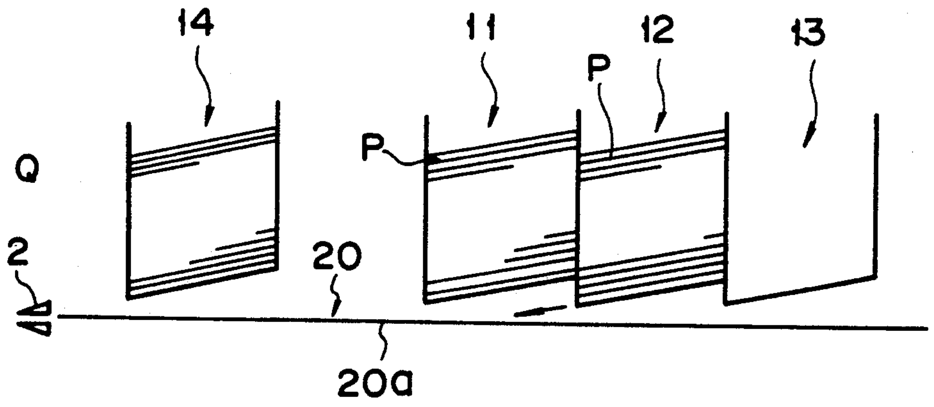
FIGS. 5 and 6 are views schematically showing two kinds of states that a new bankbook is supplied to a bankbook conveying passage from a plurality of bankbook storing means in the bankbook dealing apparatus in the ATM of FIG. 1.

In a case where all the predetermined data recording surfaces of the inserted bankbook are used up during the printing work of the printing means 10 while the bankbook detecting means 43 of third bankbook storing means 13 detects that the stock of the new bankbooks P in the third bankbook storing means 13 is empty, the CPU 200 of FIG. 4 drives the picker 15 of second storing means 12, which is secondly closest to the bank clerk operation panel 101*b* of the sheath housing 101 of the ATM 100, to supply a new bankbook P into the first bankbook conveying passage 20*a* as shown in FIG. 5.

Also, in a case where all the predetermined data recording surfaces of the inserted bankbook are used up when the printing work of the printing means 10 is done while the bankbook detecting means 42, 43 of the second and third bankbook storing means 12, 13 detect the stock of the new bankbooks P in the second and third bankbook storing means 12, 13 are empty, the CPU 200 drives the picker 15 of the first storing means 11, which is farthest from the bank clerk operation panel 101*b* of the sheath housing 101 of the ATM 100, to supply a new bankbook P into the first bankbook conveying passage 20*a*.

Also, each of the bankbook detecting means 41, 42, 43 and sheet detecting means 44 of the first to third bankbook storing means 11, 12, 13 and sheet storing means 14 is connected to monitor means 107 provided on the rear surface of the bank clerk operation panel 101*b* of the sheath housing 101 of the ATM 100, as shown in FIG. 2. The monitor means 107 warns the bank clerk that the stock of the new bankbooks P in each of the first to third bankbook storing means 11, 12, 13 and the stock of the paper sheets Q in the sheet storing means 14 are empty by a known warning means (for example, warning lamp).

The replenishment of the new bankbooks only for the third bankbook storing means 13, which is closest to the bank clerk operation panel 101*b* of the sheath housing 101 of the ATM 100, can be performed, without drawing out the printer unit 1 from the sheath housing 101 of the ATM 100 as shown in two-dot chain line of FIG. 2, only by opening the paired doors 106 of the bank clerk operation panel 101*b* of FIG. 2. Therefore, it is unnecessary to stop the operation of the ATM 100 while the new bankbooks are replenished into the third bankbook storing means 13.

Figure 6:
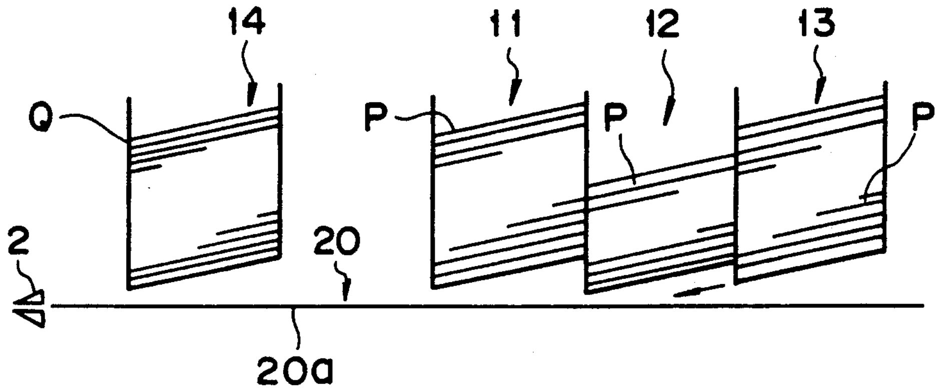

If the above replenishment is finished and the operation of the warning means corresponding to the third bankbook storing means 13 is reset, in the CPU 200, the order of priority of supplying new bankbook into the first bankbook conveying passage 20*a* is changed from the second or first bankbook storing means 12, 11 to the third bankbook storing means 13, as shown in FIG. 6.

Moreover, in each of the first to third bankbook storing means 11, 12, 13 and sheet storing means 14, abnormal action detecting means (not shown for detecting the abnormal action (for example, bankbook or sheet jamming) in these storing means. These abnormal action detecting means are also connected to the CPU 200. The CPU 200 warns the bank clerks that the abnormal action is generated in one of the first to third bankbook storing means 11, 12, 13 and sheet storing means 14 by known warning means (not shown: for example, a warning lamp or an alarm sound generator) of the monitor means 107 provided on the rear surface of the bank clerk operation panel 101*b* of the sheath housing 101 of the AT 100. Moreover, if the abnormal action is generated in one of the first to third bankbook storing means 11, 12, 13, the CPU 200 gives the order of priority of supplying new bankbook into the first bankbook conveying passage 20*a* to a bankbook storing means, which is closest to the bank clerk operation panel 101*b* of the sheath housing 101 of the ATM 100 among the bankbook storing means other than the abnormally actioned bankbook piling means and the stock of the new bankbooks in which are not empty.

In a case where the ATM 100 is installed in a stock company, informing customers of a number of data other than the content of the transaction are seriously required. In this case, a number of data is printed on a paper sheet Q by the printing means 10 and the printed sheet Q is conveyed to the bankbook/sheet access opening 2. In order to prepare against a case that a plurality of sheets Q are needed to print a number of data, printed sheet temporarily storing means 17 is provided under the first bankbook conveying passage 20 at a position just after the printing means 10.

The first bankbook conveying passage 20*a* and the sheet temporarily storing means 17 are separated from each other by a gate 17*a*, the going in and out of the sheet Q between the first bankbook conveying passage 20*a* and the sheet temporarily storing means 17 is restricted.

In a case that a number of data is printed on the plurality of sheets Q, the printed sheets are temporarily piled in the sheet temporarily storing means 17, and thereafter these piled up sheets are sent to the bankbook/sheet access opening 2 all together.

If the customer forget to draw out the bankbook P or sheet Q held at the bankbook/sheet access opening 2 so that the bankbook P or sheet Q are left as they are, the ATM 100 determines that the abnormal action occurs in the operation of the ATM itself and stops the operation thereof.

The above-mentioned means 40 for collecting and storing left-ignored bankbook/sheet, which is arranged under the first bankbook conveying passage 20*a*, prevents the ATM 100 from stopping of its operation.

The left-ignored bankbook/sheet collecting and storing means 40 has a driving roller 28 having a large diameter, which is arranged just before the entrance of the bankbook sidetracking passage 16, in the rear end of the first bankbook conveying passage 20*a*. A left-ignored bankbook/sheet collecting and conveying passage 20*b* located under the fist bankbook conveying passage 20*a* extends from the driving roller 28 toward the customer operation panel 101*a* of the sheath housing 101 of the ATM. At the distal end of the passage 20*b*, a left-ignored bankbook/sheet collecting box 21 is arranged.

A plurality of pairs of conveying rollers 29 and 30 are arranged along the left-ignored bankbook/sheet collecting and conveying passage 20*b*. On the circumferential surface of the driving roller 28, pinch rollers 31 are provided at the entrance of the bankbook sidetracking passage 16, the entrance of the left-ignored bankbook/-sheet collecting and conveying passage 20*b*, which is spaced in the clockwise direction from the former entrance, and a position spaced in the clockwise direction from the latter entrance.

A bankbook folding space 18, which has substantially triangular cross section, is formed between the entrance of the bankbook sidetracking passage 16 and the entrance of the left-ignored bankbook/sheet collecting and conveying passage 20*b*. In the bankbook folding space 18, there is arranged a page pressing roller 19 rotatably supported at one end of a rocking lever 19*a*, the substantial center of which is concentrically and rotatably supported at the pinch roller 31 of the entrance of the bankbook sidetracking passage 16. A movable guiding member 37 is also fixed to the rocking lever 19*a*.

Figure 7:
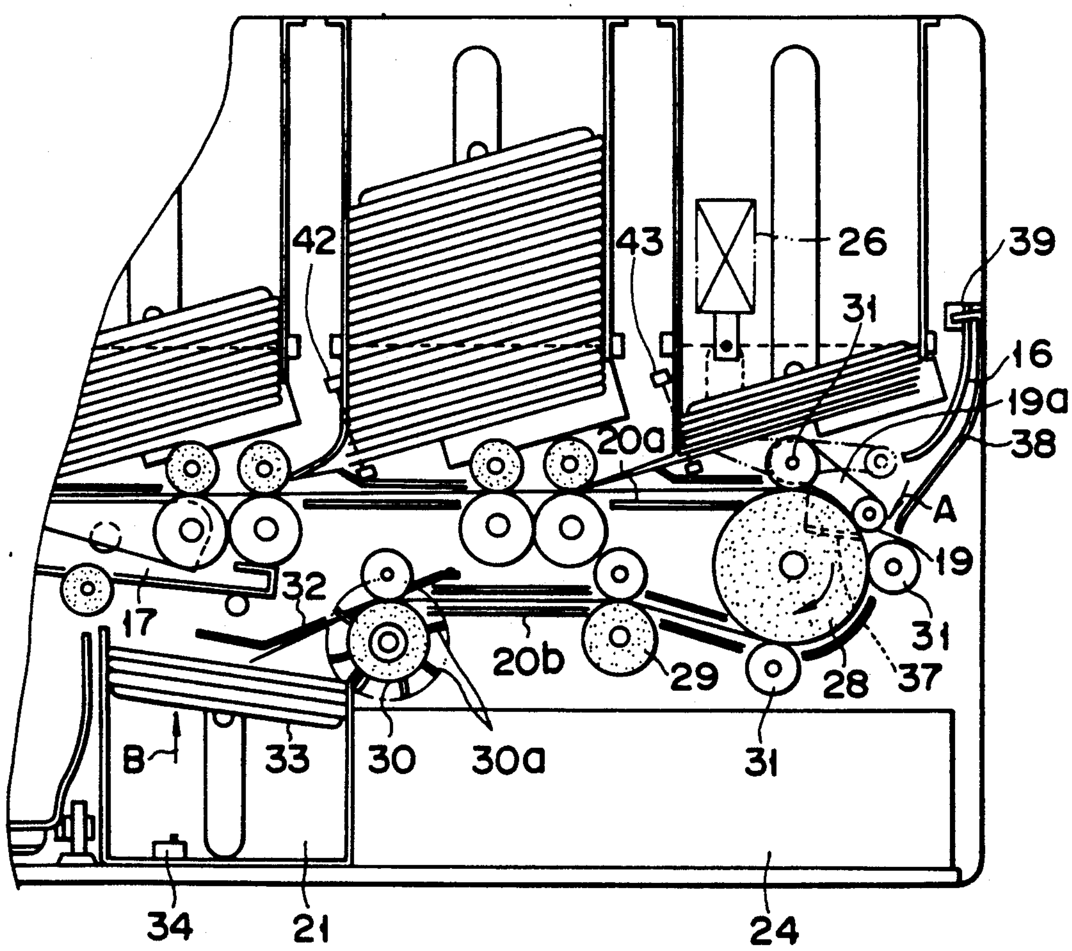
FIG. 7 is a fragmentary side view schematically showing a state that a paper sheet, which was left at a bankbook access opening of the bankbook conveying passage for more than a predetermined time, is collected from the bankbook conveying passage and piled in the bankbook dealing apparatus in the ATM by means of left bankbook storing means of FIG. 1.
Figure 8:
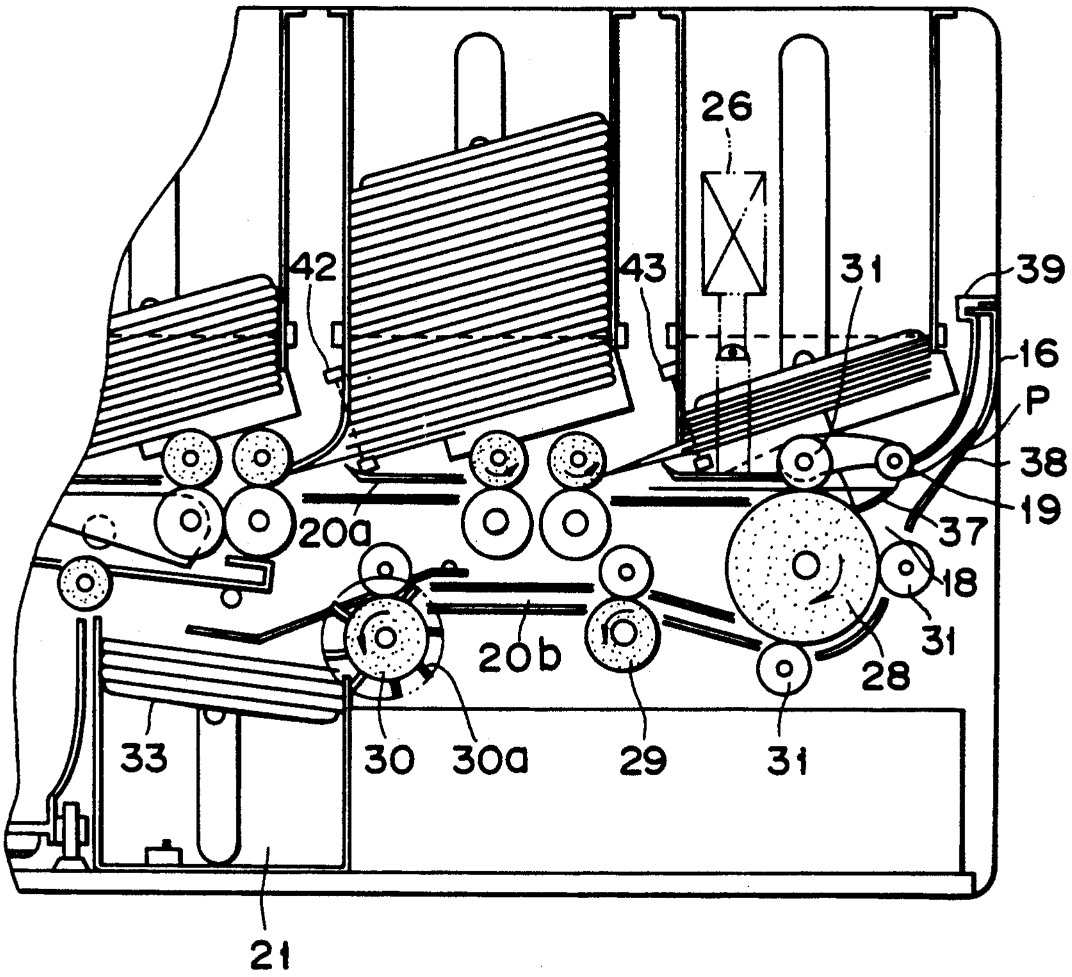
FIG. 8 is a fragmentary side view schematically showing a first half state when an opened page of the bankbook is closed by page closing means while the opened bankbook, which was left at the bankbook access opening of the bankbook conveying passage for more than a predetermined time, is collected from the bankbook conveying passage and piled in the bankbook dealing apparatus in the ATM by means of the left bankbook storing means of FIG. 1.

As shown in FIG. 7, a plunger actuator 26 using an electromagnetic solenoid is connected to the other end of the rocking lever 19*a*. The plunger actuator 26 normally operates the rocking lever 19*a* such that the page pressing roller 19 is arranged at an opening position where the page pressing roller 19 is separated from the driving roller 28 as shown in FIG. 3 and the entrance of the bankbook sidetracking passage 16 is opened. When the page pressing roller 19 is arranged at the opening position, the movable guiding member 37 is directed to the rear end of the bankbook sidetracking passage 16 in the bankbook folding space 18.

In a case where the plunger actuator 26 operates the rocking lever 19*a* such that the page pressing roller 19 is arranged at the closing position where the page pressing roller 19 is brought into contact with the driving roller 28 as shown in FIG. 7 and the entrance of the bankbook sidetracking passage 16 is closed, so that the movable guiding member 37 is detached from the bankbook folding space 18.

If the sheet Q is held at the bankbook/sheet access opening 2 as it is for more than a predetermined time, timer monitoring means, which is connected to the optical type detector (not shown) provided at the bankbook/sheet access opening 2, determines that the sheet Q is left and ignored at the bankbook/sheet access opening 2. In this case, the sheet Q is conveyed toward the rear end of the first bankbook conveying passage 20*a* through the first bankbook conveying passage 20*a* from the bankbook/sheet access opening 2. The rocking lever 19*a* of the page pressing roller 19 is rotated as indicated by arrow A from the opening position shown in FIG. 3 to the closing position shown in FIG. 7, and the page pressing roller 19 is brought into contact with driving roller 28. Thereby, the sheet Q is sent to the left-ignored bankbook/sheet collecting and conveying passage 20*b* in a state that the sheet Q is sandwiched between the driving roller 28, which is rotating in the clockwise direction, and three pinch rollers 31, as shown in FIG. 7. Moreover, the sheet Q is sent to the left-ignored bankbook/sheet collecting box 21 by the conveying roller pairs 29 and 30 of the left-ignored bankbook/sheet collecting and conveying passage 20*b*.

A backup plate 33, which is urged upward as shown in arrow B of FIG. 7 by urging force of urging means (not shown), is stored in the left-ignored bankbook/sheet collecting box 21. In the upper opening of the left-ignored bankbook/sheet collecting box 21, there is arranged a collecting guide plate 32 which opens toward the extended end of the bankbook/sheet collecting and conveying passage 20*b*.

A plurality of elastic vanes 30*a* are radially fixed to the outer peripheral surface of the driving roller which is the lower one of the paired conveying rollers 30 positioned at the extended end of the bankbook/sheet collecting and conveying passage 20*b*. The leading end of the sheet Q, which has reached at the extended end of the bankbook/sheet collecting and conveying passage 20*b*, abuts against the collecting guide plate 32, and the trailing end is knocked off from the extended end of the passage 20*b* by the plurality of the elastic vanes 30*a* of the driving roller on the lower side of the paired rollers 30, so that the sheet Q is forcibly piled up on the backup plate 33.

The plurality of the elastic vanes 30*a* of the driving roller which is the lower one of the paired rollers 30 knocks the rear end of the upper most sheet Q in the piled up sheets Q on the backup plate 33, thereby the upper most sheet Q can be effectively prevented from being lifted up by some reasons.

If the upper most sheet Q is lifted up, the upper opening of the left-ignored bankbook/sheet collecting box 21 is closed, thereby the next sheet Q, which will be sent to the left-ignored bankbook/sheet collecting box 21, is prevented from being introduced into the left-ignored bankbook/sheet collecting box 21.

On the bottom surface of the left-ignored bankbook/sheet collecting box 21, there is arranged a detector 34 for detecting the lower end position of the backup plate 33. When the backup plate 33 is detected by the detector 34, the state in which the left-ignored bankbook/sheet collecting box 21 is filled up to its capacity is warned to the bank clerks by the known warning means (for example, a warning lamp or an alarm generator: not shown) of the monitor means 107 (FIG. 2) provided on the rear surface of the bank clerk operation panel 101*b* of the sheath housing 101 of the ATM 100.

If the bankbook P is held at the bankbook/sheet access opening 2 for more than a predetermined time, the timer monitoring means, which is connected to the optical detector (not shown) provided at the bankbook/sheet access opening 2, determines that the bankbook P is left and ignored at the bankbook/sheet access opening 2. In this case, the bankbook P is conveyed toward the rear end of the first bankbook conveying passage 20*a* through the first bankbook conveying passage 20*a*. The rocking lever 19*a* of the page pressing roller 19 is maintained in the opening position shown in FIG. 3. Thereby, the leading end of the left-ignored bankbook P contacts the movable guiding member 37 in a state that the left-ignored bankbook P is sandwiched between the driving roller 28, which is rotating in the clockwise direction shown in FIG. 7, and the pinch roller 31 of the entrance of the bankbook sidetracking passage 16, and the left-ignored bankbook P is introduced into the bankbook sidetracking passage 16 by the movable guiding member 37 and a sidetracking guide member 38 of the bankbook sidetracking passage 16.

Figure 9:
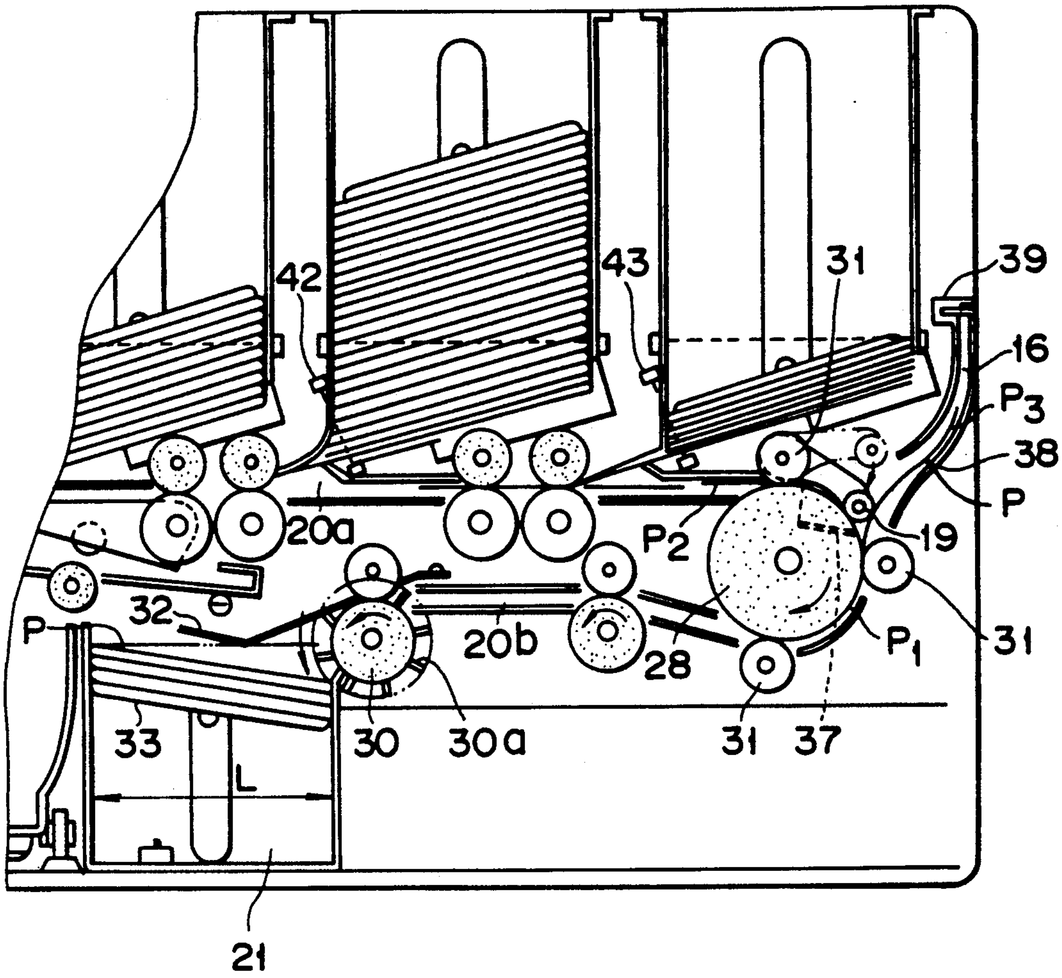
FIG. 9 is a fragmentary side view schematically showing a latter half state when an opened page of the bankbook is closed by the page closing means while the opened bankbook, which was left at the bankbook access opening of the bankbook conveying passage for more than a predetermined time, is collected from the bankbook conveying passage and piled in the bankbook dealing apparatus in the ATM by means of the left bankbook storing means of FIG. 1.
Figure 10:
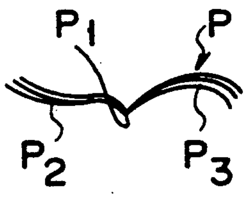
FIG. 10 is a side view schematically showing a normally opened bankbook.

If the leading end of the left-ignored bankbook P contacts a left-ignored bankbook detector 39 provided at the distal end of the bankbook sidetracking passage 16, the plunger actuator 26 operates the rocking lever 19*a* to move the page pressing roller 19 toward the closing position where the roller 19 is brought into contact with the roller 28 as shown in FIG. 9. At this time, the gutter of the left-ignored bankbook P in an opening state is positioned in the bankbook folding space 18, which has a substantially triangular cross section and is formed between the entrance of the bankbook sidetracking passage 16 and the entrance of the left-ignored bankbook/sheet collecting and conveying passage 20*b*. Due to this, the page pressing roller 19 moved to its closing position presses a page P2 (FIGS. 10 and 9) of the back half side of the bankbook P on the outer periphery of the driving roller 28 in the vicinity of the gutter of the left-ignored bankbook P in the opening state.

Thereby, the left-ignored bankbook P in the opening state becomes substantially V-shaped in such a manner that the page P2 (FIGS. 10 and 9) of the back half side of the left-ignored bankbook P is pressed on the outer peripheral surface of the driving roller 28, a page P3 (FIGS. 10 and 9) of the front half side is extended into the bankbook sidetracking passage 16, and a spine Pl (FIGS. 10 and 9) is directed to the entrance of the left-ignored bankbook/sheet collecting and conveying passage 20*b*.

Under the above condition, if the driving roller 28 is further rotated in the clockwise direction, the page P2 of the back half side of the left-ignored bankbook P in the opening state, which is pressed on the outer peripheral surface of the driving roll 28 by the pinch roller 31 located at the entrance of the bankbook sidetracking passage 16 and the page pressing roller 19, is sent between the pitch roller 31 located at the entrance of the left-ignored bankbook/sheet collecting and conveying passage **20*b* and the outer peripheral surface of the driving roller 28 in a state that the spine P1 is at the head thereof. At the same time, the page P3 of the front half side of the left-ignored bankbook P in the opening state is drawn out from the bankbook sidetracking passage 16, and sent between the pinch roller 31 located at the entrance of the left-ignored bankbook/sheet collecting and conveying passage 20*b* and the outer peripheral surface of the driving roller 28. The page P2 of the back half side and the page P3 of the front half side are put together by the pinch roller 31 located at the entrance of the left-ignored bankbook/ sheet collecting and conveying passage 20*b* and the driving roller 28, and sent into the left-ignored bank-book/sheet collecting and conveying passage 20*b*** in the closing state.

Since the plane area of the folded left-ignored bankbook P is substantially the same as that of the sheet Q, the folded left-ignored bankbook P can be piled S on the backup plate 33 of the left-ignored bankbook/ sheet collecting box 21 similar to the case of the above-mentioned left-ignored sheet Q.

The folded left-ignored bankbook P on the backup plate 33 directs the spine P1 in the opposite direction from the inlet of the left-ignored bankbook/sheet collecting and conveying passage **20*b*. In the folded left-ignored bankbook P, there is a tendency for the front cover and the rear cover to open each other as shown in two-dot chain line of FIG. 9. However, such a tendency is surely prevented by that the front and rear covers of the folded left-ignored bankbook P on the backup plate 33 are knocked downwardly by the plurality of the elastic vanes 30*a* of the driving roller which is the lower one of the paired conveying rollers 30**.

Thereby, it is surely ensured that the next left-ignored bankbook P and the next sheet Q, both of which will be sequentially sent to the left-ignored bankbook/ sheet collecting box 21, are introduced to the left-ignored bankbook/sheet collecting box 21.

Figure 11:
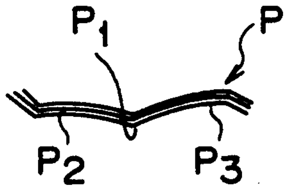
FIG. 11 is a side view schematically showing a state that an unusually bent bankbook is opened.

According to the above-structured page closing means, as shown in FIG. 11, even if the bankbook P has a tendency to folding in the portion other than the spine P1, such bankbook P can be surely piled on the backup plate 33 in the left-ignored bankbook/sheet collecting box 21 in a state that the page is closed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the data recording means; and means for controlling the passbook supplying mean. such that one new passbook is supplied from another passbook storing means to the passbook conveying means when the passbook detecting means is detecting the absence of the passbook in one of the passbook storing means.

2. The apparatus according to claim 1, wherein said control means controls said passbook supplying means such that one new passbook is supplied to said passbook conveying means from one of the plurality of passbook storing means, which is arranged at the farthest position from said passbook access opening, when all spaces of the plurality of data recording surfaces of one passbook received in said passbook conveying means are used up.

3. The apparatus according to claim 1, wherein said data recording means reads data, which has been recorded on the cover of the passbook received in said passbook conveying means via said passbook access opening, and records the read data on the cover of the new passbook when one new passbook is supplied to said passbook conveying means from one passbook storing means.

4. The apparatus according to claim 3, wherein said passbook conveying means has page turn means for turning the page of the plurality of data recording surfaces of the passbook received in said passbook conveying means via said passbook access opening until the space in the plurality of data recording surfaces is detected, and for turning the cover of one new passbook supplied to said passbook conveying means from one passbook storing means in order to detect the first space in the plurality of the data recording surfaces of the new passbook after recording the read data to the cover of one new passbook.

5. The apparatus according to claim 1, wherein said apparatus further comprises sheet storing means for storing a plurality of sheets in which data is to be recorded by said data recording means, and said control means controls the sheet storing means to cause it to selectively supply one new sheet to said passbook conveying means, and causes said data recording means to record data on the new sheet.

6. The apparatus according to claim 1, wherein said apparatus further comprises left-ignored passbook collecting/storing means for receiving again the passbook in said passbook conveying means and removing it from said passbook conveying means and storing it, when the passbook, which is returned to said passbook access opening after data is recorded on the plurality of data recording surfaces by said data recording means, is not removed from said passbook access opening within a predetermined time.

7. The apparatus according to claim 6, wherein said left-ignored passbook collecting/storing means has page closing means for closing the plurality of data recording surfaces of a left-ignored passbook before storing the left-ignored passbook removed from said passbook conveying means, therein.

8. The apparatus according to claim 7, wherein said page closing means includes:

a driving roller provided at the end portion of said passbook conveying means, the end portion being opposite to said passbook access opening;

a pinch roller working in cooperation with the driving roller;

passbook sidetracking passage means, extending from the pinch roller in a direction crossing said passbook conveying means, for temporarily side tracking the left-ignored passbook from said passbook conveying means;

left-ignored passbook collecting/conveying passage means, which is located at a side oppositing to the passbook sidetracking passage means, extends from the pinch roller in a direction crossing said passbook conveying means, and has a left-ignored passbook storing box at its extended end, for collecting the left-ignored passbook from said passbook conveying means or the passbook sidetracking passage means to the left-ignored passbook storing box and conveying the collected left-ignored passbook to the left-ignored passbook storing box; and a page pressing member, which is arranged at a position spacing in the opposite direction of said passbook access opening from the pinch roller, and movable between a detaching position in which the page pressing member detaches from the passbook sidetracking passage means and a projecting position in which the page pressing member projects into said passbook sidetracking passage means, wherein when the left-ignored passbook is discharged from said passbook conveying means via the end portion thereof by means of the driving roller and the pinch roller, the page pressing member is moved to the detaching position so as to make the left-ignored passbook be introduced into the passbook sidetracking passage means, and after the passbook is introduced into the passbook sidetracking passage means from said passbook conveying means, the page pressing member is moved to the projecting position to press a portion of the passbook, which is closer to the trailing end than the middle between the trailing end and the leading end on the driving roller, thereby the passbook is introduced into the left-ignored passbook collecting/conveying passage means by the driving roller in a state that the middle portion is placed at the head of the passbook.

9. The apparatus according to claim 5, wherein said apparatus further comprises left-ignored passbook collecting/storing means for receiving again the passbook or the sheet in said passbook conveying means and removing it from said passbook conveying means and storing it, when the passbook, which is returned to said passbook access opening after data is recorded in the plurality of data recording surfaces by said data recording means, or the sheet, which is conveyed to said passbook access opening after data is recorded on the sheet, is not removed from said passbook access opening within a predetermined time.

10. The apparatus according to claim 9, wherein said left-ignored passbook collecting/storing means has page closing means for closing the plurality of data recording surfaces of a left-ignored passbook before storing the left-ignored passbook, removed from said passbook conveying means, therein.

11. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the data recording means; and means for controlling the passbook supplying means such that one new passbook is supplied to said passbook conveying means from one of the plurality of passbook storing means, which is arranged at the farthest position from said passbook access opening, when all spaces of the plurality of data recording surfaces of one passbook received in said passbook conveying means are used up.

12. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the data recording means; and means for controlling the passbook supplying means such that one new passbook is supplied from another passbook storing means to the passbook conveying means when the passbook detecting means is detecting the absence of the passbook in one of the passbook storing means;

wherein the data recording means reads data, which has been recorded on the cover of the passbook received in the passbook conveying means via the passbook access opening, and records the read data on the cover of the new passbook when one new passbook is supplied to the passbook conveying means from one passbook storing means, and the passbook conveying means has page turn means for turning the page of the plurality of data recording surfaces of the passbook received in the passbook conveying means via the passbook access opening until the space in the plurality of data recording surfaces is detected, and for turning the cover of one new passbook supplied to the passbook conveying means from one passbook storing means in order to detect the first space in the plurality of the data recording surfaces of the new passbook after recording the read data to the cover of one new passbook.

13. The apparatus according to claim 12, wherein said control means controls said passbook supplying means such that one new passbook is supplied to said passbook conveying means from one of the plurality of passbook storing means, which is arranged at the farthest position from the passbook access opening, when all spaces of the plurality of data recording surfaces of one passbook received in the passbook conveying means are used up.

14. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the data recording means;

means for controlling the passbook supplying means such that one new passbook is supplied from another passbook storing means to the passbook conveying means when the passbook detecting means is detecting the absence of the passbook in one of the passbook storing means; and sheet storing means for storing a plurality of sheets in which data is to be recorded by the data recording means;

wherein the control means controls the sheet storing means to cause it to selectively supply one new sheet to the passbook conveying means, and causes the data recording means to record data on the new sheet.

15. The apparatus according to claim 14, wherein said control means controls said passbook supplying means such that one new passbook is supplied to said passbook conveying means from one of the plurality of passbook storing means, which is arranged at the farthest position from said passbook access opening, when all spaces of the plurality of data recording surfaces of one passbook received in said passbook conveying means are used up.

16. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, and so that the remains of data are recorded on one of the data recording surfaces of the new passbook by the data recording means;

means for controlling the passbook supplying means such that one new passbook is supplied from another passbook storing means to the passbook conveying means when the passbook detecting means is detecting the absence of the passbook in one of the passbook storing means; and left-ignored passbook collecting/storing means for receiving again the passbook in the passbook conveying means and removing it from the passbook conveying means and storing it, when the passbook, which is returned to the passbook access opening after data is recorded on the plurality of data recording surfaces by the data recording means, is not removed from the passbook access opening within a predetermined time:

wherein the data recording means reads data, which has been recorded on the cover of the passbook received in the passbook conveying means via the passbook access opening, and records the read data on the cover of the new passbook when one new passbook is supplied to the passbook conveying means from one passbook storing means, and said passbook conveying means has page turn means for turning the page of the plurality of data recording surfaces of the passbook received in the passbook conveying means via the passbook access opening until the space in the plurality of data recording surfaces is detected, and for turning the cover of one new passbook supplied to the passbook conveying means from one passbook storing mean in order to detect the first space in the plurality of the data recording surfaces of the new passbook after recording the read data to the cover of one new passbook.

17. The apparatus according to claim 16, wherein said control means controls said passbook supplying means such that one new passbook is supplied to said passbook conveying means from one of the plurality of passbook storing means, which is arranged at the farthest position from the passbook access opening, when all spaces of the plurality of data recording surfaces of one passbook received in the passbook conveying means are used up.

18. An apparatus for dealing with a passbook, comprising:

an access opening for inserting or drawing a passbook having a plurality of data recording surfaces;

passbook conveying means for receiving the passbook inserted into the access opening and returning the received passbook to the access opening;

means for recording data on a space in a plurality of data recording surfaces of the passbook received in the passbook conveying means via the access opening;

a plurality of passbook storing means, arranged along the passbook conveying means, for storing a plurality of new passbook which are the same kind as the above described passbook;

passbook detecting means for detecting the presence or absence of the passbook in each of the plurality of passbook storing means;

passbook supplying means for supplying a new passbook from one of the passbook storing means to the passbook conveying means when all spaces in the plurality of data recording surfaces of the passbook received in the passbook conveying means are used up, so that the remains of data are recorded on one of the data recording surfaces of the new passbook by the data recording means;

means for controlling the passbook supplying means such that one new passbook is supplied from another passbook storing means to the passbook conveying means when the passbook detecting means is detecting the absence of the passbook in one of the passbook storing means;

sheet storing means for storing a plurality of sheets in which data is to be recorded by the data recording means; and left-ignored passbook collecting/storing means for receiving again the passbook in the passbook conveying means and removing it from the passbook conveying means and storing it, when the passbook, which is returned to the passbook access opening after data is recorded on the plurality of data recording surfaces by the data recording means, is not removed from the passbook access opening within a predetermined time;

wherein the data recording means reads data, which has been recorded on the cover of the passbook received in the passbook conveying means via the passbook access opening, and records the read data on the cover of the new passbook when one new passbook is supplied to the passbook conveying means from one passbook storing means, the passbook conveying means has page turn means for turning the page of the plurality of data recording surfaces of the passbook received in the passbook conveying means via the passbook access opening until the space in the plurality of data recording surfaces is detected, and for turning the cover of one new passbook supplied to the passbook conveying means from one passbook storing means in order to detect the first space in the plurality of the data recording surfaces of the new passbook after recording the read data to the cover of one new passbook, the control means controls the sheet storing means to cause it to selectively supply one new sheet to the passbook conveying means, and causes the data recording means to record data on the new sheet, the left-ignored passbook collecting/storing means receives again the sheet in the passbook conveying means and removes the sheet from the passbook conveying means and stores the sheet when the sheet, which is returned to the passbook access opening after data is recorded on the sheet, is not removed from the passbook access opening within a predetermined time, and the left-ignored passbook collecting/storing means has page closing means for closing the plurality of data recording surfaces of a left-ignored passbook before storing the left-ignored passbook, removed from the passbook conveying means, therein.

19. The apparatus according to claim 18, wherein said control means controls said passbook supplying means such that one new passbook is supplied to said passbook conveying means from one of the plurality of passbook storing means, which is arranged at the farthest position from the passbook access opening, when all spaces of the plurality of data recording surfaces of one passbook received in the passbook conveying means are used up.

* * * * *